United States Patent [19]
Sternberger et al.

[11] 3,773,625
[45] Nov. 20, 1973

[54] SOLUBLE ANTIGEN-ANTIBODY COMPLEXES

[75] Inventors: Ludwig A. Sternberger, Lutherville, Md.; John J. Cuculis, Fawn Grove, Pa.; Howard G. Meyer, White Hall, Md.

[73] Assignee: The United States of America as represented by the Secretary of the Army

[22] Filed: Apr. 8, 1971

[21] Appl. No.: 132,457

[52] U.S. Cl................... 195/99, 195/68, 195/63, 195/103.5 R
[51] Int. Cl.............................................. C12k 1/00
[58] Field of Search..................... 195/103.5 R, 63, 195/68

[56] References Cited
OTHER PUBLICATIONS

Oncley et al., "J. Phys. Chem." 56:90–92 (1952)
Singer et al., "J. Am. Chem. Soc." 77:3499–3504 (1955)
Cothran et al., "Ann. Allergy" 22:259–268 (1964)
Singer et al., "J. Am. Chem. Soc." 74:1794–1802 (1952)
Singer et al., Ibid., 77:4851–4857 (1955)

*Primary Examiner*—Alvin E. Tanenholtz
*Assistant Examiner*—Max D. Hensley
*Attorney*—Harry M. Saragovitz, Edward J. Kelly, Herbert Berl and Bernard J. Ohlendorf

[57] ABSTRACT

A composition of matter and method useful for purposes such as identification of spirochetes and electron microscopic localization of tetanus toxin in nervous tissue; the composition being prepared by forming a soluble antigenantibody complex, such as peroxidase-antiperoxidase, by the addition of a moderate antigen excess to immune precipitates and subsequent pH adjustment to 2.3. Upon neutralization, the antigen reequilibriates with the antibody into soluble complexes of homogeneous composition, and the complex is separated from free antigen by precipitation with a predetermined chemical agent, such as ammonium sulfate regarding the aforementioned peroxidase-antiperoxidase complex.

10 Claims, 1 Drawing Figure

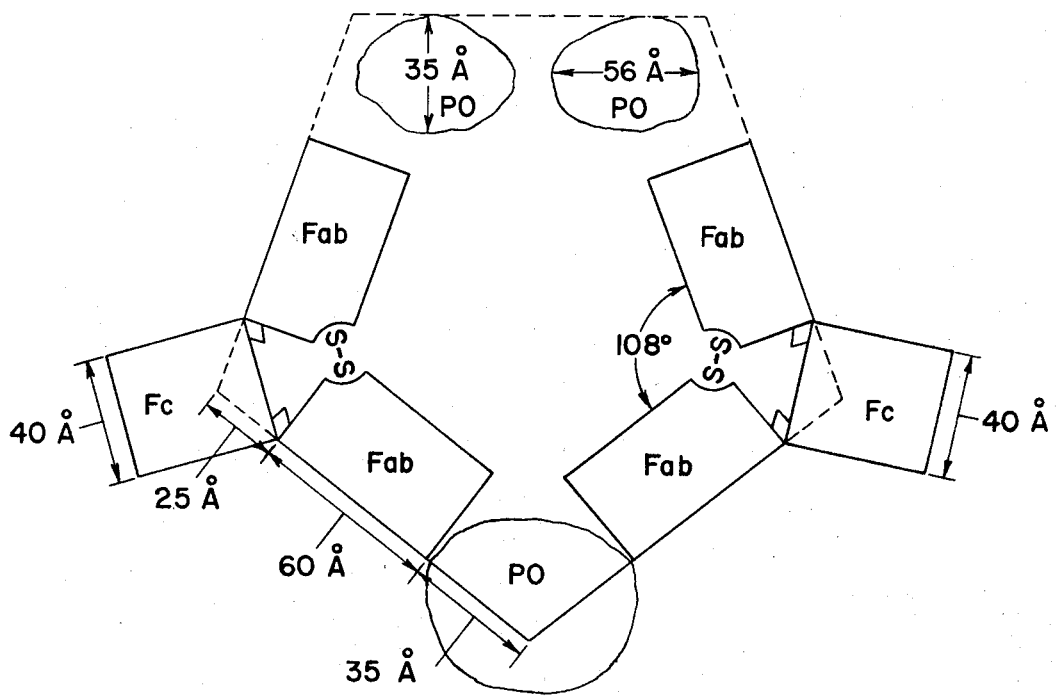

SOLUBLE ANTIGEN-ANTIBODY COMPLEXES

DEDICATORY CLAUSE

The invention described herein may be manufactured, used, and licensed by or for the Government for governmental purposes without the payment to us of any royalty thereon.

Our invention relates to a new unlabeled antibody enzyme method of immunohistochemistry and a new soluble antigen-antibody complex composition of matter employed therein.

Our new method and composition of matter has utility, among other uses, in the identification of spirochetes and the electron microscopic localization of tetanus toxin in nervous tissue.

The prior art method for preparing soluble antigen-antibody complexes consisted of precipitating the antibody with specific antigen and redissolving the washed precipitate by shaking with excess antigen, as described by S. J. Singer and D. H. Campbell in *Physical Chemical Studies of Soluble Antigen Antibody Complexes. I. The Valence of Precipitating Rabbit Antibody*, J. Amer. Chem. Soc. 74:1794, 1952 and in *Physical Chemical Studies of Soluble Antigen Antibody Complexes. V. Theromodynamics of the Reaction Between Ovalbumin and Its Rabbit Antibody*, J. Amer. Chem. Soc. 77:4851, 1955. The aforementioned prior art method presented a multiplicity of problems which include the resolubilization of the antibody with specific antigen from the precipitate being incomplete unless exceedingly large amounts of antigen were employed; the shaking of the antigen-antibody precipitate with excess antigen being a prolonged procedure which resulted in partial denaturation of the precipitate constituents; and the soluble complexes being heterogeneous mixtures which included free antigen, complexes of antigen-antibody of ratio of 2:1, complexes of antigen-antibody of ratio of 3:2, and a mixture of unidentified antigen-antibody complexes of lower ratios. Our invention was conceived and reduced to practice to solve the aforementioned problems and to satisfy the long felt need for a soluble antigen-antibody complex for use in immunohistochemistry which is homogeneous as to composition, molecular weight, and molecular size and which does not require a large excess of antigen to form and does not result in denaturation of the complex constituents during the formation of the complex.

The principal object of our invention is to provide a soluble antigenantibody complex and method of immunohistochemistry which is economical and rapid to use and does not result in denaturation of any complex constituents during the complex formation.

Another object of our invention is to provide a soluble antigen-antibody complex and method of immunohistochemistry wherein the antigen is reequilibriated with the whole of the immune precipitate rather than only with that fraction of the precipitate that is slowly redissolved by excess antigen.

A further object of our invention is to provide a soluble antigen-antibody complex and method of immunohistochemistry wherein the most avid antibodies are employed which engender the lowest chance of dissociation from tissue.

Other objects of our invention will be obvious or will appear in the specification hereinafter set forth.

The drawing is a diagram of a molecule of peroxidase-antiperoxidase complex, hereinafter referenced as PAP and hereinafter described. In the drawing, PO designates a peroxidase antigen, Fab designates an antibody fragment containing a specific combining site, Fc designates a crystalizable and class determining antibody fragment site, and S-S designates a bisulfide linkage; the antibody being a material such as immunoglobulin G and hereinafter referenced as IgG.

Generally, our invention is described as a soluble antigen-antibody complex prepared by the addition of a moderate antigen excess to immune precipitates and subsequent pH adjustment to 2.3. Upon neutralization, the antigen, such as peroxidase and hereinafter referenced as PO, reequilibrated with the antobody into soluble complexes of homogeneous composition, and the complex was separated from the free antigen by precipitation with a predetermined chemical agent, such as ammonium sulfate regarding the peroxidase-antiperoxidase complex subsequently described.

Our invention will now be described in detail as follows.

EXAMPLE I

Fourteen milliliters of an aqueous solution containing 950μg PO/ml, such as Horseradish Peroxidase, were mixed with 40.0 ml rabbit antiserum to PO, and the resulting immune precipitate was allowed to develop at room temperature for 1 hour. Following precipitation, the following procedure was carried out in refrigerated containers at approximately 0°C to 2°C or in a cold room at approximately 5°C. The precipitate was centrifuged at 10,000 rpm for about 20 minutes by a conventional centrifuge and washed three times with 500 ml portions of chilled saline, 0.15 N NaCl. The precipitate was then resuspended in 27.0 ml of an aqueous solution containing 1,900μg PO/ml and dissolved by adjustment of the solution pH to 2.3 at 1°C. Two drops of 1.0 N hydrochloric acid and 12 drops of 0.1 N hydrochloric acid were consumed in the pH adjustment. The solution was immediately neutralized to approximately pH 7.4 and 2.7 ml of 0.08 N sodium acetate solution and 0.15 N ammonium acetate solution were added to the neutralized solution. An equal volume of an ammomium sulfate solution, saturated at approximately 2°C to 5°C, was slowly admixed to the foregoing solution. The resulting suspension was stirred for about 25 minutes and centrigufed for about 16 minutes at 17,500 rpm by a conventional centrifuge to remove the suspended particles from the neutralized solution, and the supernatant liquid was retained for further analysis. The precipitate of the suspended particles was washed once in 0.5 saturated ammonium sulfate solution, dissolved in 30 ml of water and dialyzed against three changes of 15 liters each of sodium-ammonium acetate saline (13.5 liters saline, such as 0.15 N NaCl, 1.5 liters water, 75 ml 1.5 N sodium acetate and 75 jl 3 N ammonium acetate solution). At least one day was allowed for each change of dialysis. A small precipitate that had formed after dialysis was conventionally removed by centrifugation at 17,500 rpm for about 16 minutes. Five 2.0 ml portions of the resulting solution were frozen with Dry Ice and acetone and stored at −20°C for future use. Optionally, the resulting solution can be stored in a cold room at approximately 2°C to 5°C.

As described in the above example for preparing PAP, our procedure can be applied to the preparation of soluble complexes from any precipitating antigenantibody system, and the procedure can be carried out at any temperature, including room temperature. The excess of antigen may be any amount higher than 3 times that necessary for the original precipitation of antibody, and the PH of dissociation may be anywhere above pH 9.0 or below 5.0.

When treated with the above prepared PAP by conventional staining technique, spirochetes obtained on the fourteenth day after inoculation of cortisone-treated rabbits became greatly thickened and deeply stained when treated with the unlabeled antibody peroxidase, Example II procedure below. The organisms were clearly visible at 125-fold and 550-fold bright field light microscopic magnification. When the staining procedure dilutions of normal serum were substituted for dilutions of immune serum or when the rabbit antiserum was entirely omitted, the organisms were only faintly stained. Nevertheless, they were visible at 550-fold bright field magnification. Had staining been entirely negative, the organisms should have been invisible at this or higher field light microscopic magnification, because the diameter of T. pallidum is only $0.1\mu$. It is considered that the low degree of staining in the control preparations, particularly in those in which rabbit antiserum was entirely omitted, was due to small amounts of antibodies formed in the host rabbits within 14 days of infection despite immunosuppressive treatment by cortisone. Although the organisms may not have been combined with antibody in the lesion itself, they unquestionably have had contact with host serum during isolation. To exclude or minimize this possibility, other spirochetes were obtained on the sixth day after inoculation. When stained according to Example II below, and after exposure to dilutions of antisyphilitic serum, the spirochetes became as intensely stained as the organisms obtained on the fourteenth day described above. In controls stained after omission of rabbit serum and with the otherwise complete staining procedure, the organisms were fainter than those obtained on the aforementioned fourteenth day. The suspensions of organisms obtained on the sixth day were not as heavy as those obtained on the fourteenth day, and it was concluded that small amounts of antibody indeed had formed in the sera of cortisone-treated rabbits 14 days after infection; but on the sixth day only minimal amounts of antibody were available. Spirochetes obtained on the sixth day after infection and stained by procddure of Example II below after exposure to dilutions of normal serum, instead of antisyphilitic serum, also were less marked than similarly treated organisms obtained on the fourteenth day, but, nevertheless, they were visible. Since normal animals contain saprophytic spirochetes and since these spirochetes cross-react with T. pallidum, attempts were made to block these cross-reacting antigenic sites. The blocking was accomplished by preapplication of normal sheep serum, Example III below, on the basis that normal sheep contain antibodies against saprophytic spirochetes similar to those of normal rabbits and that any sheep antispirochetal antibody combined with the organisms would not react with the subsequently applied sheep anti-rabbit IgG. When Example III procedure was employed with various dilutions of rabbit antisyphilitic sera on spirochetes obtained 6 days after infection, the sensitivity was not impaired relative to Example II procedure. However, controls treated with dilutions of normal rabbit serum instead of antisyphilitic serum were fainter than those stained by Example II procedure. Most of the organisms remained invisible and the rare ones seen were only faintly visualized and had to be searched for on the slide. This contrasts with the prominence and abundance of the organisms in any field of the slide upon specific staining. When rabbit serum was omitted in the otherwise complete staining Example III procedure, the spirochetes remained entirely invisible in bright field microscopy. Similarly, when in the otherwise complete staining procedure (using any dilution of antisyphilitic or normal rabbit serum) and anti-IgG being omitted, the spirochetes were not visualized.

We considered reactions positive only when the spirochetes were deeply stained, greatly thickened and immediately apparent on low power (125-fold) and medium powerr (550-fold) bright field microscopy, and the end points of titers of antisera were estimated by this criterion. The end point is obvious even without comparison with controls. It is considered that positive reactions can be identified within the skill of the art at higher titers is comparison with controls are made.

A comparison of unlabeled antibody peroxidase titers and indirect fluorescent antibody titers obtained after application of rabbit sera showed that the unlabeled antibody peroxidase method was about 100 to 1,000 times more sensitive in the evaluation of the five strongly reacting antisyphilitic sera. See Table I below. On the other hand, the reaction of normal sera by immunoflorescence was not exacerbated with the unlabeled antibody peroxidase technique. Hence, the method was also 100 to 1,000 times more specific. For reasons unknown, the titers of the two poorly reacting postinoculation sera were similar with the immunofluorescence and the unlabeled antibody peroxidase techniques.

In the staining experiments described above, only the rabbit sera were diluted, and the other three staining factors used prior to osmication were as follows: (a) anti-immunoglobulin G, hereinafter referenced as IgG, undiluted; (b) PAP, concentrations given in Table II below; and (c) 3,3'-diaminobenzidene tetrahydrochloride hereinafter referenced as DAB, 0.05%; hydrogen peroxide 0.01%. However, titers remained unaffected when any one or two of factors (a), (b), or (c) above were diluted 1:10 in addition to the usual dilutions of rabbit sera. When all three of the aforementioned factors were diluted, staining intensity was diminished.

Our inventive method has also been specific at high sensitivity for the electron microscopic localization of tetanus toxin in nervous tissue. However, it was necessary to apply the staining materials prior to embedding for electron microscopy using paraformaldehyde-fixed tissue, sectioned in the frozen state at 20 $\mu$ thickness.

Analysis of the supernatant liquid from the ammonium sulfate precipitation, referenced in the above Example I, in the preparation of PAP revealed no significant amount of anti-PO. See Table II below. When trace amounts of anti-PO present are combined with PO as complexes of 2 molecules of PO and 1 molecule of anti-PO, they account for only a minimal fraction of either the free PO in the supernatant liquid or of the PO in the PAP precipitated with the ammonium sulfate. Less than one-third of the PO used for preparation of PAP appeared as free PO in the ammonium sulfate supernatants which indicated that most of the excess PO was recovered in the complex with high efficiency.

The yields of PAP relative to anti-PO employed ranged from 52–98%. In preparations in which high titer antisera were used and in which the initial immune precipitates were centrifuged at high spped and washed, the yields approached 100%.

TABLE I

Comparison of Sensitivities of the Unlabeled Antibody Peroxidase and the Fluorescent Antibody Methods in the Detection of Spirochetes with Dilutions of Immune Sera

| Rabbit No. | Unlabeled Antibody Peroxidase Method[a] | | Fluorescent Antibody Method | |
|---|---|---|---|---|
| | Pre-inoculation titer[b] | Post-inoculation titer[b] | Pre-inoculation titer[b] | Post-inoculation titer[b] |
| 7 | <10 | 1,000,000 | <10 | 1,280 |
| 9 | <100 | 100,000 | 10 | 1,280 |
| 5 | ND[c] | 100,000 | 10 | 1,280 |
| 10 | <10 | 1,000,000 | 10 | 640 |
| 18 | 10 | 100,000 | 10 | 2,560 |
| 20 | 10 | 1,000 | <10 | 160 |
| 4 | <10 | 10 | <10 | 320 | a. Example II procedure.
b. Reciprocals of dilution
c. Not done.

TABLE II

Composition of Ammonium Sulfate Supernatants Remaining in the Preparation of Soluble Peroxidase-Antiperoxidase Complex (PAP) by Acid-Dissociative Exchange of IMMUNE Precipitates with Excess Antigen

| Preparation | Volume ml | PO µg/ml | Anti-PO µg/ml | Free PO[a] µg/ml | Free PO[b] % Total |
|---|---|---|---|---|---|
| A | 23 | 176 | 42 | 156 | 26 |
| B | 34 | 357 | 25 | 344 | 30 |
| C | | 405 | 39 | 385 | |
| D | 54 | 123 | 0 | 123 | 22 |
| E | 50 | 305 | 44 | 283 | 33 | a. Based on each anti-PO molecule binding 2 molecules of PO
b. (Free PO in supernatant × 100/(Total PO in supernatant) + (PO in PAP).

EXAMPLE II

Immunohistochemical staining was carried out as follows. One to two drops of reagents were applied in sequential steps to spirochetes on glass slides; the slides having been placed on moistened beaker mats in covered Petri dishes. After each step, the slides were first rinsed with 10 ml of wash solution slowly dripping from a pipette and then washed for 5 minutes by immersion in wash solution. The spirochetes on the slides were than sequentially treated according to the following steps.

Step 1: Dilutions of rabbit antisyphilitic serum for 30 minutes followed by rinse and wash in tris 0.15 N NaCl, hereinafter referenced as T (serum was diluted in T containing 0.1 percent gelatin).

Step 2: Sheep anti-rabbit IgG for 30 minutes followed by rinse and wash in T.

Step 3: PAP for 30 minutes followed by rinse in T and wash in tris water, hereinafter referenced as TAD.

Step 4: A freshly prepared solution containing 0.05% of 3,3'-diaminobenzidene tetrahydrochloride, hereinafter referenced as DAB, and 0.01% of hydrogen peroxide for about 5 minutes followed by rinse and wash in water.

Step 5: The slides were placed in a glass chamber containing osmium tetroxide crystals; the chamber was sealed with Teflon tape; the chamber was placed upon a water bath at about 60°C for about 30 minutes; and staining was accomplished after the slides were removed from the chamber according to the procedure reported by Seligman, A.M., Wasserkrug, H.L. and Hanker, J.S.: *A New Staining Method (OTO) for Enhancing Contrast of Lipid - Containing Membranes and Droplets in Osmium-Fixed Tissue with Osmiophilic Thiocarbohydrazide (TCH).* J. Cell Biol. 30:424, 1966.

EXAMPLE III

Same as Example II above except that the slides were treated with normal sheep serum for about 30 minutes followed by rinse and wash with T prior to step 1 of Example II.

Staining with fluorescent antibodies was done by the indirect method reported by Deacon, U.E., Lucas, J.B., and Price, E.V.: *Fluorescent Treponemal Antibody-Absorption (FTA-AB) Test for Syphilis.* J.A.M.A. 198:624, 1966.

Irrespective of the serum pool used, the ratio of PC to anti-PO in each preparation of PAP was close to 3:2. See Table III below. On double diffusion, rabbit serum (anti-PO) and anti-rabbit IgG formed seven lines of precipitation. The major line, due to IgG, exhibited identity with the line formed by PAP and anti-IgG. The single line formed between PAP and anti-PO spurred on the IgG line between rabbit anti-PO and anti-rabbit IgG. The spur does not in itself indicate identity of PAP reactive with anti-PO and anti-IgG, because anti-PO cannot diffuse into the domain surrounding the anti-IgG well and would yield spur formation even if PO and anti-IgG in PAP were separate components. However, addition of anti-IgG to PAP precipitated 99.1% of enzymatic activity, which attested to the fact that the PO in PAP was indeed bound and that there was no significant amount of free PO. Comparison of diffusion rates of PAP and IgG against anti-IgG showed that PAP diffusion was retarded relative to that of IgG, which indicated that the IgG was bound in PAP inasmuch as any significant amount of free IgG would have formed faster moving bands and would have precluded the appearance of the trailing PAP band. Furthermore, PAP gave a single peak on sedimentation and a regular appearance on negative as well as positive staining in electron microscopy; all of which attest to the homogeneity of the complex.

On electrophoresis, PO moved slower toward the anode than IgG, and PAP moved faster toweard the anote than either PO or IgG. This cannot be due to neutralization of charge upon reaction of PO with IgG, because, in such case, the mobility would have been intermediate. The reason for this acceleration in movement toward the anode is considered to be due to the larger molecular size of PAP in comparison to PO and IgG, which results in retardation relative to the buffer in the agar gel sieve and which attests again to the fact that PO and IgG are bound in PAP even when in an electric field. The single band formed by PAP with anti-PO extended farther toward the cathode than the band formed with anti-IgG. This shows that the distribution of charge on the complex is heterogeneous and that in some forms of complex antigenic determinants of IgG predominate and in other forms of complex antigenic determinants of PO predominate. Similarly, the degree of impairment of enzymatic activity as a result of the reaction of PO with anti-PO in the formation of PAP was heterogeneous, ranging from 2 to 62. See Table III below. The enzymatic activity of PO alone was not affected by treatment at pH 2.3, 1°C.

The PAP complex consisted of 3 molecules of PO for each 2 molecules of anti-PO which suggested a molecular weight of 432,000 or any multiple thereof for PAP. The dedimentation constant of PAP was determined to be $11.98 \times 10^{-B}$, and the diffusion constant of $2.48 \times 10^{-7}$ was determined by analysis; yielding a molecular weight of 429,000 by sedimentation velocity. Sedimentation equilibrium gave a molecular weight of 410,000 by an independent measurement. Using this figure and the sedimentation constant, the calculated diffusion constant becomes $3.59 \times 10^{-7}$.

These data indicate that PAP is a pentameric molecule, as shown in the drawing, consisting of two IgG and three PO subunits. This structure was confirmed by direct electron microscopic observation after negative or positive staining. PAP wassumed the form of pentagonal rings with diameters of 205 A. Since electron micrography gave no evidence of twisted forms, the rings are considered to be of flat configuration.

TABLE III
Composition of soluble peroxidase antiperoxidase complex (PAP) purified from various pools of antiperoxidase (Anti-PO) sera

| | Antiserum source | | |
|---|---|---|---|
| Preparation | Serum pool No. | Volume used, ml. | Anti-PO content, µg./ml. |
| A | II | 28 | 1,465 |
| B | III | 40 | 1,789 |
| C | III | 20 | 1,789 |
| D | III | 35 | 1,789 |
| E | I | 89 | 639 |

| | Purified peroxidase-antiperoxidase complex | | | | | | |
|---|---|---|---|---|---|---|---|
| Preparation | Excess PO employed [a] | Vol. PAP obtained, ml. | PO contents, g./ml. | Anti-PO contents, µg./ml. | Mole ratio PO/anti-PO [b] | Enzymatic activity,[c] percent | Yield, percent |
| A | 3.6 | 23 | 446 | 1,157 | 3.02/2 | 98 | 66 |
| B | 4.9 | 32 | 847 | 2,179 | 3.06/2 | 63 | 97 |
| C | 4.9 | 17 | 411 | 965 | 3.34/2 | 44 | 4$_6$ |
| D | 4.9 | 28 | 826 | 2,185 | 2.98/2 | 38 | 9$_8$ |
| E | 5.0 | 27 | 483 | 1,089 | 3.48/2 | 78 | 5$_2$ |

[a] Ratio of total PO used for preparation of PAP to PO employed in precipitating anti-PO from antiserum at equivalence.
[b] Taking themmolecular weight of anti-PO as 156,000 and that of PO as 39,800.
[c] (Enzymatic activity per mole of PO in PAP)×100 (Enzymatic activity per mole of PO used for preparation of PAP).
[d] (Anti-PO in total PAP) ×100/Anti-PO in total serum pool.

The above description clearly demonstrates that our inventive unlabeled antibody immunohistochemistry method provides high sensitivity in the histochemical localization of antigen; a simple and rapid method for the preparation of specifically purified and soluble antigen-antibody complex which circumvents the need for the preparation of specifically purified antibody; and a product which is yielded in high concentration, stability, and homogeneity.

It is obvious that other modifications can be made of our invention, and we desire to be limited only by the scope of the appended claims.

We claim:

1. A discrete complex composition of matter for use in identifying infections and toxin materials, said composition consisting essentially of a soluble peroxidase-antiperoxidase complex which is homogeneous in composition in which the peroxidase-antiperoxidase ratio is three peroxidase molecules to two anti-peroxidase molecules.

2. The composition of claim 1 wherein the substance is horseradish peroxdose-antihorseradish peroxidase.

3. The composition of claim 1 wherein the substance is a pentameric molecule consisting of three molecules of peroxidase and two molecules of anti-peroxidase; said substance having a molecular weight of 429,000 by sedimentation velocity, a sedimentation constant of $11.98 \times 10^{-B}$, and a diffusion constant of $2.48 \times 10^{-7}$.

4. The composition of claim 2 wherein the substance has a molecular configuration of flat pentagonal rings having diameters of 205 A.

5. The composition of claim 3 wherein each side of the pentameric molecule is 120 A, each peroxidase molecule has a short axis of 35 A and a long axis of 56 A, the specific combining sites of the anti-peroxidase molecules are joined by a linkage at 108°, and a side of the crystallizable and class determining fragment of the anti-peroxidase molecules is 40 A.

6. The composition of claim 5 wherein the linkage is a bisulfide linkage.

7. A rapid method of preparing a specifically purified and soluble peroxidase-antiperoxidase complex for high sensitivity in the histochemical localization of antigen comprising the steps of forming a solution containing peroxidase; adding an antibody material to the solution to produce an immune precipitate; suspending the immune precipitate in a second solution containing a moderate excess of peroxidase; adjusting the pH of the immune precipitate suspension to 2.3 at 1°C; neutralizing the adjusted pH suspension; separating the peroxidase-antiperoxidase complex from free peroxidase in the neutralized suspension by adding a predetermined chemical agent to the neutralized suspension to effect precipitation of the peroxidase-antiperoxidase complex; and finally treating the peroxidase-antiperoxidase complex by the disolution, dialyzing, and separation of any precipitated impurity.

8. A rapid method of preparing a specifically purified and soluble peroxidase-antiperoxidase complex for high sensitivity in the histochemical localization of antigen comprising the steps of dissolving approximately 950 µg of a peroxidase per ml in an aqueous solution medium, mixing about fourteen milliliters of the peroxidase solution with about forty milliliters of rabbit antiserum to form an immune precipitate, developing the immune precipitate for about one hour at room temperature, removing the immune precipitate from the aqueous medium, washing the immune precipitate in a saline solution, suspending the washed precipitate in about 27 ml of an aqueous solution containing about 1,900μg of a peroxidase per ml, adjusting the pH of the aqueous solution to 2.3 at 1°C to dissolve the suspended precipitate in the aqueous solution, neutralizing the adjusted pH solution to a pH of approximately 7.4, adding about 2.7 ml of 0.08 N sodium acetate and 0.15 N ammonium acetate to the neutralized solution, adding an equal volume of a saturated ammonium sulfate solution to the neutralized solution containing the sodium and ammonium acetate to produce a suspension, stirring the ammonium sulfate produced suspension for about 25 minutes, removing the sulfate produced suspended particles from the suspension medium, washing the removed sulfate produced suspended particles in a one half saturated ammonium sulfate solution, dissolving the washed sulfate produced suspended particles in about 30 ml of water, dialyzing the solution of the ammonium sulfate produced suspended particles against about 15 liters of a saline solution, removing any precipitate formed, and recovering the resulting solution.

9. The method of claim 8 wherein the peroxidase is horseradish peroxidase; the immune precipitate is removed by centrifuging at about 10,000 rpm for about twenty minutes; the saline solution for washing the immune precipitate is 0.15 N NaCl and three washings of 500 ml portions each of the saline solution are used; the pH adjustment to 2.3 at 1° C is accomplished by the addition of about two drops of 1.0 N HCL and about 12 drops of 0.1 N HCl; the saturated ammonium sulfate solution is saturated at approximately 2°C to 5°C; three dialysis changes are used with at least one day allowed for each dialysis change; and the dialysis saline solution comprises about 13.5 liters of 0.15 N NaCl, 1.5 liters of $H_2O$, 75 ml of 1.5 N sodium acetate, and 75 ml of 3N ammonium acetate; and any precipitate after dialysis is removed by centrifuging at about 17,500 rpm for about sixteen minutes.

10. The method of claim 8 wherein the solution after dialysis and precipitate removal is frozen in 2.0 ml portions with dry ice and acetone and stored at −20°C for future use.

* * * * *